July 5, 1955  A. LIEB  2,712,612
VOLTAGE REFERENCE INDICATING VALVE
Filed Nov. 10, 1951  4 Sheets-Sheet 1

INVENTOR.
ALBERT LIEB
BY Philip M. Bolton
ATTORNEY

July 5, 1955 A. LIEB 2,712,612
VOLTAGE REFERENCE INDICATING VALVE
Filed Nov. 10, 1951 4 Sheets-Sheet 2

INVENTOR.
ALBERT LIEB
BY Philip M. Bolton
ATTORNEY

July 5, 1955 A. LIEB 2,712,612
VOLTAGE REFERENCE INDICATING VALVE
Filed Nov. 10, 1951 4 Sheets-Sheet 3

INVENTOR.
ALBERT LIEB
BY Philip M. Bolton
ATTORNEY

July 5, 1955  A. LIEB  2,712,612
VOLTAGE REFERENCE INDICATING VALVE
Filed Nov. 10, 1951  4 Sheets-Sheet 4

INVENTOR.
ALBERT LIEB
BY Philip M. Bolton
ATTORNEY

United States Patent Office 2,712,612
Patented July 5, 1955

2,712,612

VOLTAGE REFERENCE INDICATING VALVE

Albert Lieb, Oberesslingen, Germany, assignor to C. Lorenz Aktiengesellschaft, Stuttgart-Zuffenhausen, Wurttemberg (Baden), Germany, a corporation of Germany Application November 10, 1951, Serial No. 256,941

Claims priority, application Germany November 11, 1950

3 Claims. (Cl. 313—107.5)

The invention relates to indicating valves which are capable of comparing the magnitudes of two or more voltages, especially to indicate the equality of two or more changeable voltages. Indicating valves of this kind especially apply to the indication of the tuning condition of receivers of frequency modulated carriers. The invention consists of a vacuum-container, of a preferably axial electronic emissive cathode, an indicating grid surrounding the cathode, a fluorescent anode and of two or more electrodes which influence the cathode-ray pattern. These electrodes, in the following characterized as reference electrodes, may be constructed in the shape of pins, metal sheets, grids and so forth. The reference electrodes, according to the invention, are placed in such a way that at least two of these electrodes are located symmetrically with respect to a plane which runs through the cathode axis and which, simultaneously, represents a suitable symmetrical plane of the beam anode. In operated condition of the indicating mechanism these electrodes are so supplied with the voltages which are to be compared that a symmetrical cathode-ray pattern is projected as indicator-characterization when voltages are equal, and that an asymmetrical one is projected when there is any difference of voltages. Furthermore, the invention provides that one or more of the voltages to be compared may be supplied via an amplifier system. Thereby the advantage of a more sensitive indication is attained. According to the invention, care is taken that the amplification factors of the employed system are equal and independent of changeable and time-dependent valve characteristics. Examples of various embodiments of the invention will be explained in conjunction with the attached drawings.

Figs. 1 and 3 are diagrammatic plan views of the valve shown in Fig. 1 and illustrate the indicator beam in a symmetrical position and an unsymmetrical position respectively;

Figure 13:
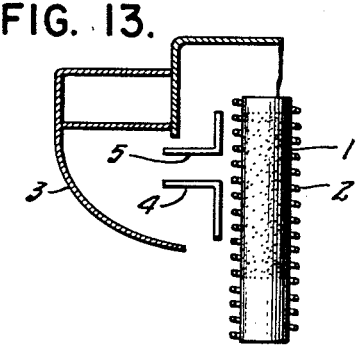
Figure 16:
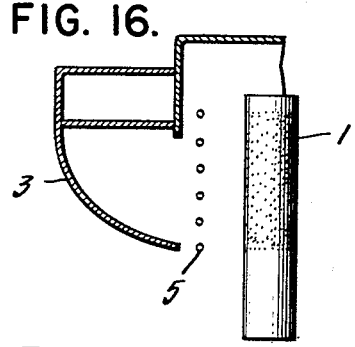
Figure 14:
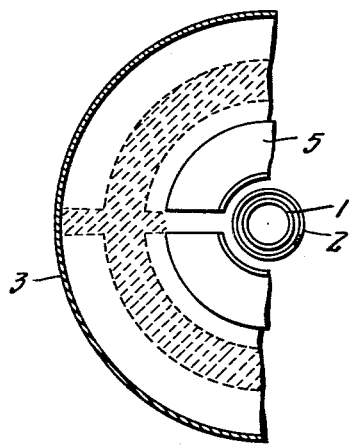
Figure 17:
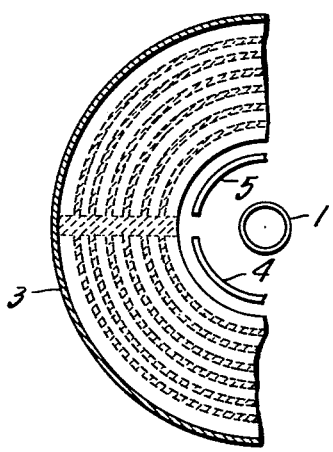
Figure 15:
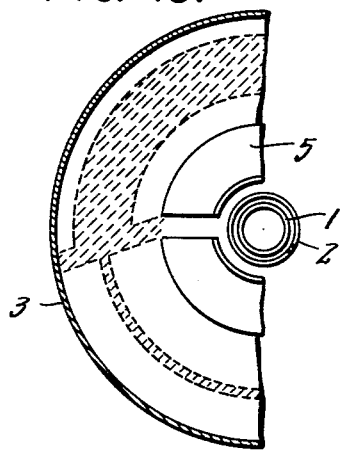
Figure 18:
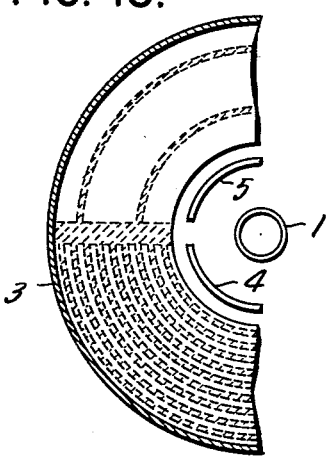
Figure 19:
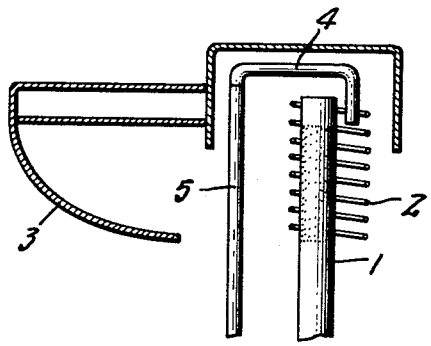
Figure 20:
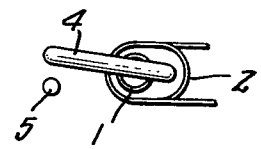
Figure 21:
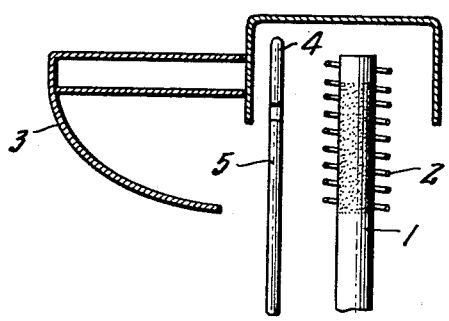
Figure 22:
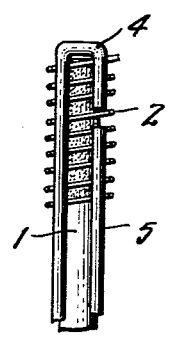
Figure 23:
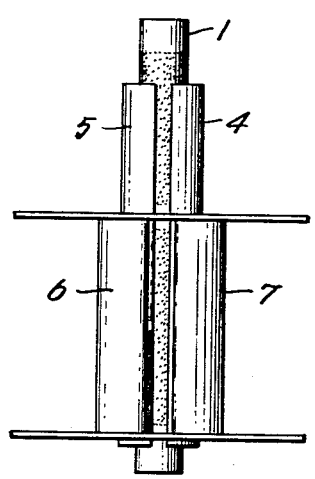
Figure 24:
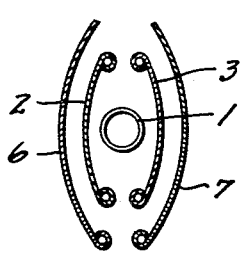

A further modification of the valve is shown in Figs. 13, 14 and 15, the first figure being a diagrammatic showing in side elevation and partly in section, and the latter two views showing in plan view the valve giving two different indications;

Figs. 16, 17 and 18 show slightly altered constructions provided with two grids divided in a symmetrical plane, the first figure being a diagrammatic showing in side elevation and partly in section, and the last two plan views illustrating two different indications;

Fig. 19 is a diagrammatic showing in side elevation and partly in section of a modified form of indicator valve utilizing with the amplifier anode and diode section a common cathode;

Fig. 20 is a fragmentary plan view of the valve shown in Fig. 19;

Figs. 21 and 22 show in fragmentary side elevation a modified form of indicator valve where there is included a triode amplifier as a part of the structure; and Figs. 23 and 24 show a modification of the valve illustrated in Figs. 21 and 22 wherein the electrodes are radially positioned.

Figure 1:
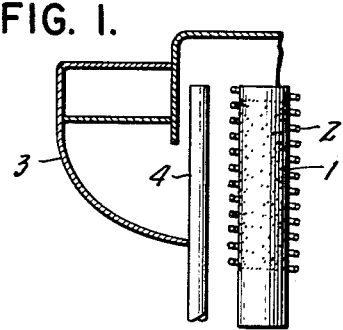
Fig. 1 shows diagrammatically inside elevation and partly in section, an indicating valve in accordance with my invention.
Figure 2:
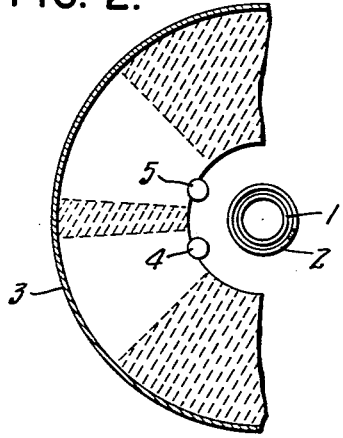
Figure 3:
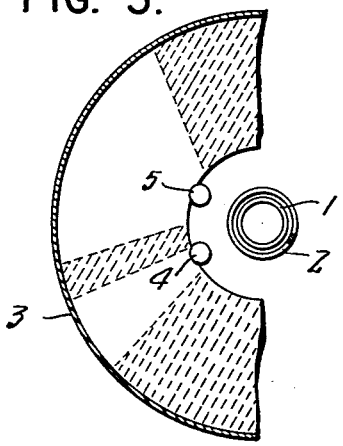

Figs. 1 and 2 show an axial cathode 1, and a space charge grid 2, which is surrounded by a cathode-ray screen 3 and preferably constructed in the known bowl-shaped form. The voltages to be compared will be put to both of the electrodes 4 and 5. The cathode-ray pattern, which is pointed out in Fig. 2 by hatchlines, will appear at equality of voltages. The fluorescent pattern is characterized by two same-sized, sharply limited sector shadow zones, symmetrically divided by an indicator beam or beam-sector, located within the symmetrical plane. A difference of the voltages is indicated by a noticeable disturbance of the symmetrical beam position. The deflection of the indicator beam or beamsector from the symmetrical plane is to be regarded as a special characterization. As the deflection of this beam is nearly proportional to the difference in voltage of the two reference electrodes, and as the beam is deflected by changing of the voltages put to the electrodes in such a way that the new position is produced by movement of the beam from its position of symmetry, it is possible to attain a readable magnitude of the voltage difference, with the help of a scale or marking in the same way that a reading is obtained on a testing instrument by movement of an indicating needle with respect to a scale. The scale may, for instance be marked on the cathode-ray screen by impression (stamping), by mixing extraneous material with the phosphorescent substance, by removing parts of the phosphorescent substance and so forth. Specially provided by the invention is the marking of the medium beam-sector for the zero voltage difference. Furthermore the invention provides that the beam-sectors at the sides may be prevented from showing by means of suitable obscuring diaphragms or by limiting the cathode-ray screen to the area upon which the central or indicator beam impinges. In this case only the indicator beam will be visible. A specially sensitive indication of the difference in voltage is given, when both shadow-sectors are projected with a very narrow space between them. This may be achieved by a suitable small spacing of the reference electrodes and by a suitable selection of the voltage level of said reference electrodes. Any difference of voltage will be indicated by an asymmetrical cathoderay pattern such as shown in Fig. 3. It is advisable that the electrodes should have the shape of round pins which are demonstrated in Figs. 1 and 2. However sheets may be used instead.

Figure 4:
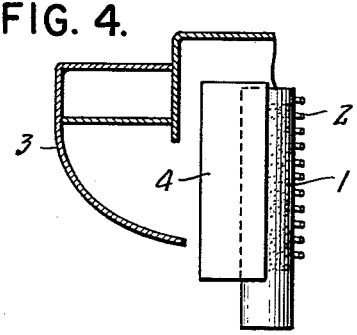
Fig. 4 shows in side elevation and partly in section a valve similar to that of Fig. 1 except that the reference electrodes encircle the cathode concentrically.
Figure 5:
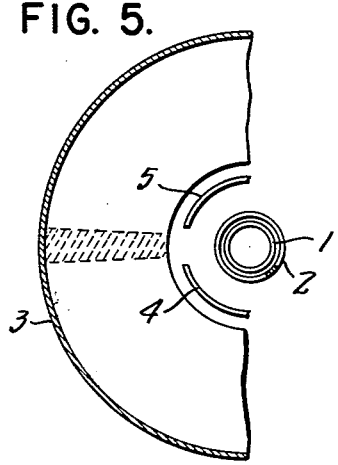
Figs. 5 and 6 are plan views showing the valve of Fig. 4 and illustrate the indicator beam in a symmetrical and an unsymmetrical position respectively.
Figure 6:
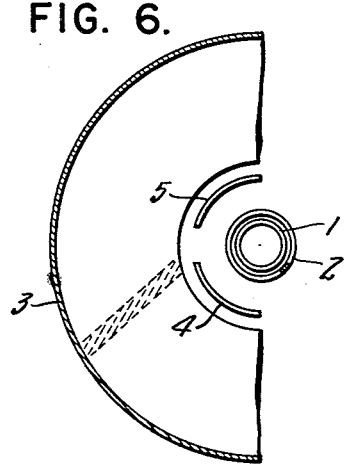

Such an arrangement is shown in Figs. 4, 5 and 6. The reference electrodes 4 and 5 consist in this case of two plates which preferably encircle the cathode concentrically. As indicated in Fig. 5 by hatch-lines, the cathoderay pattern, will show on the screen. In case of a voltage difference it will appear according to Fig. 6. The semicircular fluorescent pattern, as outlined in the above mentioned modification as well as in the following ones, may be extended to a circular shape. When applying this revision to the reference electrodes, arrangements will result with double the number of reference electrodes, i. e. with four electrodes in the above mentioned examples.

Figure 7:
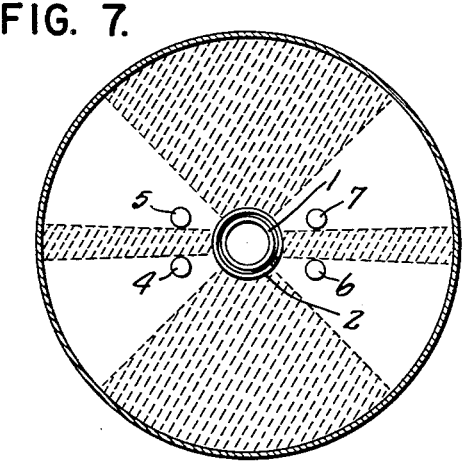
Fig. 7 is a plan view of a modification of the valve shown in Figs. 4, 5 and 6.

Such a variation of the above modification is shown in Fig. 7. By means of connections between 5 and 6 and between 4 and 7 the electrodes 4, 5, 6, 7, may be supplied with the reference voltages in alternate order, and on the other hand equilaterally operated by means of connections between 4 and 6, and between 5 and 7.

Figure 8:
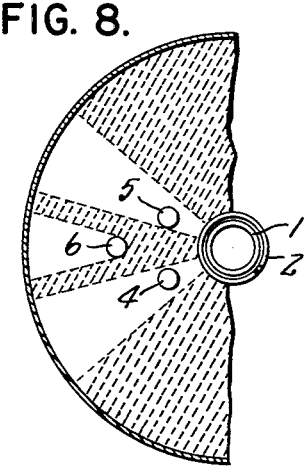
Fig. 8 shows a still further modified form of valve structure.

A slightly altered type is shown in Fig. 8. Symmetrically between the two reference electrodes 4, 5 to which the reference voltages are put, there is a further deflection electrode 6 preferably in the shape of a round pin. This electrode can be put at the same time reference voltage as pin 4 or 5 to the same voltage or to another constant one, or to a voltage which is likely to change during the process of comparison. The beam shape according to equality of voltages is shown in Fig. 8. This symmetrical beam shape is very sensitive towards a difference in voltage of the electrodes 4 and 5.

Figure 10:
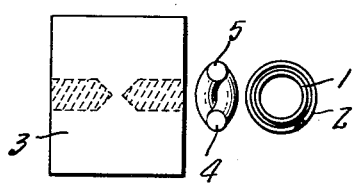
Figs. 10, 11 and 12 are fragmentary views of a valve similar to that of Fig. 9 except provided with a crossed arrangement of the control props.
Figure 11:
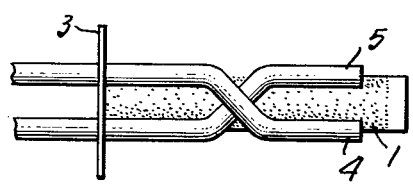
Figure 9:
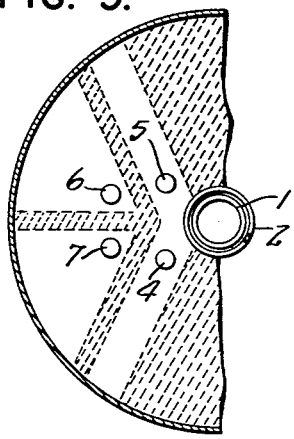
Fig. 9 illustrates a valve with four deflection electrodes.
Figure 12:
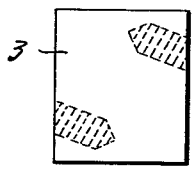

In the type device with four deflection electrodes 4, 5, 6, 7, as shown in Fig. 9, the electrodes 6 and 7 which are preferably connected with each other, form a unit and are placed at a positive voltage opposite the cathode. The reference voltages are applied to the electrodes 4 and 5. The hatch-lined fluorescent pattern results from equality of voltage. A difference in voltage is indicated, by the disappearance of the central indicator beam. Furthermore the invention foresees that the electrode pins may take a sloped or partially sloped position towards the cathode axis. The crossed arrangement of the control electrode pins, resulting from the partially sloped position, as shown in Figs. 10, 11 and 12, is regarded to be a very advantageous arrangement. In this type structure, a plane fluorescent screen anode is provided which is sloped towards the cathode axis, as shown in Figs. 10 and 12. The resulting cathode-ray pattern at equal voltage of the reference electrodes is shown in Fig. 10 and the cathode-ray pattern at different voltage in Fig. 12, both marked with hatch-lines.

A further modification of the invention is shown in Figs. 13, 14, 15. In this case, the reference electrodes are constructed in the shape of two sheet rings, divided in the symmetrical plane and encircling the cathode. The rings should have preferably the shape described in Figs. 13 and 14. The indication pattern at equal voltage is shown in Fig. 14. The number of sheet rings can also be increased. A correspondingly increased number of beam-rings is shown in the fluorescent pattern.

Figs. 16, 17 and 18 show a slightly altered construction. Here, two grids, divided in the symmetrical plane, serve as reference electrodes. This type arrangement results from the above diagram, when the number of sheet rings is increased and the ring-width is reduced. At equality of voltage the cathode-ray pattern shows, according to Fig. 17, a multiple of narrow concentrical beam-rings. At difference in voltage, the fluorescent pattern is characterized, as shown in Fig. 18, by an altered mutual space between the beam-rings and by a different position of the beam-rings. At the same time this divided grid may take over also the function of the indicating grid. The above mentioned type structures may be combined in any agreeable way. A combination of modification 1, 2, 3 with the modification shown in Figs. 13, 14, 15, for instance, will give a fluorescent pattern resulting from the combination of the cathode-ray patterns shown in Figs. 14 and 15 and 2, 3.

According to a further characterization of the invention, the voltages to be compared may be provided via one or more amplifier arrangements located inside or outside the envelope of the indicator valve. With certain types of application of the indicator valve, a changeable voltage is to be compared with a constant voltage.

In this case only the changeable voltage needs to be amplified.

In case the electrical values of the valve change during operation, for instance, through alteration of the filament voltage, an influence upon the tuning pattern may appear and therewith the possibility of a mistuning. The invention, therefore, provides that a diode section is switched parallel to the electrode to which the reference voltage is applied. This diode section is of such dimensions that it takes the same current out of the cathode as the amplifier anode, when both reference voltages are equal. The reference electrode which is connected to the diode, is joined with the same external resistance to the same source of voltage as the amplifier system. Indication faults, resulting from possible alternations of the valve character, are mostly avoided thereby, especially, when the amplifier anode and the diode section are fed by the same cathode. The side-view of Fig. 19 and the plan view of Fig. 20 show a special type of this indicating valve. There, for instance, the diode section is combined with the indicating system and the indication of voltage-equality is carried out by means of two round pins according to the modification of Figs. 1 and 7. Reference electrode 4, which is not supplied with the voltage to be compared, is twisted in the shape of a hair-pin and points with its outer end into the upper part of the inner grid-cathode-space of the indicating system.

In another modification of the invention a triode, controlled by electronic space charge, is connected in parallel, to a reference electrode. Both reference electrodes are connected, each with a resistance of equal magnitude, to the same source of voltage.

This triode, which is situated outside or preferably inside, the same vacuum container as the indicating system and preferably around the same cathode, will be dimensioned in such a way, that it exhibits the same current as the anode circuit of the amplifier system at equality of voltage of the voltages to be compared. A preferred type is shown in Figs. 21 and 22. Herein, reference electrode 4, not connected to the amplifier system, is shown to be longer. The upper, higher part of the electrode represents the parallel connected triode section. As shown in Fig. 22, this part of the electrode may also be twisted angularly to the shape of a hair-pin. Also in accordance with the invention a sheet or strip is attached to the upper reference electrode.

The methods of stabilizing the balancing pattern at equality of voltage, mentioned up to now, are characterized by a single arrangement. They provide, however, only a reduction of the occurring indicating faults. A nearly complete prevention of these faults will be achieved, when two amplifier systems are employed. Both amplifier systems may be placed, one upon another, in two story fashion alongside the axial cathode. But a simple construction and a better symmetry in arrangement will be achieved by a radial division of the system. Figs. 23 and 24 show a special type model of this kind. Cathode 1, showing a round shape in Fig. 23, which preferably, however, may also have an oval profile, is partially encircled by two control grids 2, 3 and the anodes 6 and 7. The electrodes 2, 6 and 3, 7 each forms a separate amplifier system. Anode 6 is connected to the reference electrode 4 and anode 7 to reference electrode 5.

In operation of the voltage reference indicating valve, the anodes of both amplifier systems are connected via the same external resistance to the same source of voltage. When employing the voltage reference indicating valve for indication of the tuning condition of receivers for frequency modulated carriers, the reference electrodes, the control electrodes of the amplifier systems belonging to the reference electrodes, are connected to the points of the discriminator or the ratio rectifier which, at the tuning on carrier mid-point shows no voltage difference and at the same tuning beyond the carrier mid-point, according to the sense of direction of the detuning, shows either a positive or a negative difference of voltage. For the tuning condition on carrier mid-point, a symmetrical fluorescent pattern will be seen as the cathode-ray pattern, whereas an asymmetrical fluorescent pattern will show the mistuning beyond carrier-mid-point. In order to avoid positive voltages of the reference electrodes, or control electrodes of the amplifier systems relative to the cathode and therewith circumstances permitting a prejudicial power consumption of the control circuits, the cathode of the indication valve may be brought by suitable switching means, such as a resistance in the cathode connection, to a positive potential in comparison to the rest-potential of the control electrodes or reference electrodes. Owing to the fact that the tuning pattern in this kind of indication, when tuning for reception at the carrier mid-point and without the presence of a carrier, is indistinguishable, it is required, especially in order to relieve the silent tuning, to make the existence, or the non-existence of a carrier, recognizable in the fluorescent pattern. For this the invention provides several possibilities. For instance, the indicating grid of the beam system may be connected to the control circuit of the limiting step, to the noise suppressor or to the switch points of the ratio rectifier, at which the additional voltage of the two rectifier-diodes appears. Thereby a changed fluorescent screen current is caused upon the tuning of receivers in a frequency area without carrier oscillation towards one, where carrier oscillations do appear. This changed fluorescent screen current leads to a changed beam density of the fluorescent screen. Circumstances may permit it being reduced so far, that the fluorescent pattern entirely disappears.

If the indicating electrodes are connected to the source of voltage via the load resistances, then, with the change of fluorescent current, a geometrical shifting results, because the currents, picked-up by the reference electrodes and, consequently, the voltage drops in the external resistances, are changed. When using amplifier systems, these external resistances already are included as circuit elements. As a further feature of the invention one or several electrodes situated in a symmetrical plane, respectively pairs of electrodes which are situated symmetrically to this plane and are not employed for voltage reference indication, may be used for indicating the carrier oscillation. For reasons of projection, such voltages are preferred herein, which are, towards the cathode, positive. In the modification, shown in Figs. 8 and 9, the control electrode 6, or control electrodes 6 and 7 may be at a positive voltage which changes upon the reception of a modulated carrier, for instance, with the screen grid voltage or the anode voltage of a controlled valve stage. The fluorescent pattern with and without reception of the carrier oscillation, will thereby be changed in a recognizable way. In the modification shown in Fig. 8, for instance, the magnitude of the shadow sector, situated in the symmetrical plane, and the location of the two following fluorescent sectors are changed. In the modification shown in Fig. 9, the magnitude of the beam lying within the symmetrical plane, and the location and magnitude of the two flanking beams are changed.

By means of the symmetrical arrangement of the present voltage reference indicating valve, it is, in a simple way, possible also to indicate the tuning condition of receivers with an amplitude-modulated carrier favourably. With regard to this use, the indicating valves may be combination valves, which are able to indicate the tuning condition of either receivers with frequency-modulated carriers or of such with amplitude-modulated carriers. For the purpose of indicating the tuning condition of receivers with amplitude-modulated carriers, both of the reference electrodes, or when using amplifiers in cascade, the two control electrodes of the amplifier system, may be connected either singly, preferably, however, together, to the control circuit (line). The positive bias of the cathode, which may be generated by a resistance in the cathode circuit, is, most suitably, cancelled at this indication of amplitude-modulated oscillation. The magnitude of the control voltage, the indication of which is necessary for the establishment of the tuning condition, may be taken, according to the chosen fluorescent pattern, from the magnitude and position of either a shadow-line, a beam-edge, a beam-ring or a shadow-ring. In case both reference electrodes, as stated above, are connected together to the control circuit, the fluorescent pattern will be symmetrical in each tuning phase. In the modification shown in Fig. 2, an enlargement of both beam-sectors situated outside the symmetrical plane results upon an increase of the positive voltage of the reference electrodes which, in this case, are connected. Likewise the beam or beam-sector, lying in the symmetrical plane, increases, whilst the two shadow sectors, lying in between, are reduced.

What is claimed is:

1. A voltage reference indicating valve comprising an evacuated envelope, an electron emitting cathode, a fluorescent anode and two control electrodes for controlling the fluorescent pattern, said two electrodes being mounted symmetrically with respect to a plane which runs through the cathode axis and intersects the fluorescent anode, said electrodes consisting of two pins inclined with respect to the axis of said cathode.

2. A voltage reference indicating valve comprising an evacuated envelope, an electron emitting cathode, a fluorescent anode and two control electrodes for controlling the fluorescent pattern, said two electrodes being mounted symmetrically with respect to a plane which runs through the cathode axis and intersects the fluorescent anode, said two electrodes being in the form of pins crossed in said symmetrical plane.

3. A voltage reference indicating valve comprising an evacuated envelope, an electron emitting cathode, a fluorescent anode and two control electrodes for controlling the fluorescent pattern, said two electrodes being mounted symmetrically with respect to a plane which runs through the cathode axis and intersects the fluorescent anode, said two electrodes being elongated and crossing each other in said symmetrical plane.

References Cited in the file of this patent

UNITED STATES PATENTS

| Number | Name | Date |
| --- | --- | --- |
| 2,105,818 | Parker | Jan. 18, 1938 |
| 2,167,842 | Jackson | Aug. 1, 1939 |
| 2,219,506 | Steimel et al. | Oct. 29, 1940 |
| 2,243,034 | Heins | May 20, 1941 |
| 2,273,800 | Jensen | Feb. 17, 1942 |
| 2,311,672 | Le Van | Feb. 23, 1943 |
| 2,315,945 | Downey | Apr. 6, 1943 |
| 2,318,140 | Clark | May 4, 1943 |
| 2,366,320 | Elston | Jan. 2, 1945 |
| 2,594,025 | Jacobi et al. | Apr. 22, 1952 |
| 2,594,026 | Jacobi et al. | Apr. 22, 1952 |